United States Patent
Ku et al.

(10) Patent No.: US 8,346,425 B2
(45) Date of Patent: Jan. 1, 2013

(54) SURFACE INSPECTING DEVICE

(75) Inventors: Kai-Yuan Ku, Taipei (TW);
Shih-Chung Kang, Taipei (TW);
Shang-Hsien Hsieh, Taipei (TW);
Jia-Ruey Chang, Taipei (TW); Peter Liu, Taipei (TW)

(73) Assignee: National Taiwan University, Taipei (TW)

( * ) Notice: Subject to any disclaimer, the term of this patent is extended or adjusted under 35 U.S.C. 154(b) by 655 days.

(21) Appl. No.: 12/509,146

(22) Filed: Jul. 24, 2009

(65) Prior Publication Data
US 2010/0138097 A1 Jun. 3, 2010

(30) Foreign Application Priority Data
Nov. 28, 2008 (TW) ................................ 97146437 A

(51) Int. Cl.
*F16H 48/06* (2006.01)
(52) U.S. Cl. ......................................... 701/27; 280/5.32

(58) Field of Classification Search .................... 701/27;
305/127, 199, 196, 126; 180/9.32, 907, 9.3,
180/8.2–8.5; 280/5.32, 5.26, 5.28; 700/245,
700/249, 250, 255, 258
See application file for complete search history.

(56) References Cited

U.S. PATENT DOCUMENTS

| 7,088,107 B2 * | 8/2006 | Yamaoka et al. | 324/537 |
| 7,654,348 B2 * | 2/2010 | Ohm et al. | 180/9.32 |
| 7,784,570 B2 * | 8/2010 | Couture et al. | 180/9.1 |
| 2010/0016114 A1 * | 1/2010 | Chang | 475/149 |
| 2011/0178669 A1 * | 7/2011 | Tanaka et al. | 701/25 |

* cited by examiner

*Primary Examiner* — Dalena Tran

(57) ABSTRACT

A modular surface inspecting device is provided. A modular surface inspecting device comprises a computing layer having a processing unit in which a modular service-oriented software is installed; a detecting layer having a plurality of sensors obtaining a plurality of surrounding information; and a dynamic layer carrying the computing layer and the detecting layer and controlled by a controlling command generated by the computing layer according to the plurality of surrounding information.

13 Claims, 5 Drawing Sheets

SURFACE INSPECTING DEVICE

FIELD OF THE INVENTION

The present invention relates to a surface inspecting device, in particular, to surface inspecting robot.

BACKGROUND OF THE INVENTION

In recent years, the construction industry technical field puts lot of efforts and emphasizes much expectations on robot automatization, since there are quite a few accidences occurring at the constructing sites, waste of the laboring for the repetitive work during constructing period, such as labors wasted on site filling or ground excavating and a lot of inconsistency of constructing quality for the same work. Therefore, many studies, such as Russell, Skibniewski and Maynard et al., have already begun for designing and developing the construction robots for supporting and assisting the construction industry. However, those robots are only designed to meet the requirements for executing a single piece of task, and therefore their productivity and efficiency are quite limited and could still be improved. Besides, because such robot is also aimed to resolve a specific problem, researchers need not only a lot of time to collect the sensors and actuators suitable for such specific robot, but need also to develop a specific algorithm to deal with the signals received from the sensors.

The above-mentioned research and development (R&D) for designing such robot is a repeated and try-and-error testing process and usually consumes a vast of tedious time and manpower. With regret, the majority of robot's hardware and software system architecture can not be compatible with other robots, so that the R&D thereof can not support each other. To overcome the mentioned drawbacks of the prior art, a surface treatment method and device thereof are provided.

SUMMARY OF THE INVENTION

In the present invention, it is aimed to develop a prototype of an automatized surface or pavement inspecting robot. The robot could be easily applied in the reality world for testing and operating the surface inspection, in particular to the pavement inspection. With regarding to the design of the hardware for the automatized robot is fully considered the flexibility and reusability including the possibility for exchanging hardware in the future operation. For instance, adding another detecting instrument or replacing different dynamic element. A hierarchy-based flexible architecture is thus adopted. As to the software, in order to make the software more flexible, a modular service-oriented software having multiple driving element corresponding to the respective hardware element is used, which codes an independent driving element for the respective corresponding hardware element. Therefore, each of the driving elements can be integrated as one software, which can be simply replaced corresponding to the variation of the hardware, so that while the hardware elements are changed or varied the software including multiple driving elements is not needed to be substantially modified in the future. Thus the robot made according to the present invention owns excellent flexibility and reusability. Typically the robot is automatized robots that can be flexibly applied to detect or inspect the surface or pavement.

According to the first aspect of the present invention, a modular surface inspecting device is provided. A modular surface inspecting device comprises a computing layer having a processing unit in which a modular service-oriented software is installed; a detecting layer having a plurality of sensors obtaining a plurality of surrounding information; and a dynamic layer carrying the computing layer and the detecting layer and controlled by a controlling command generated by the computing layer according to the plurality of surrounding information.

Preferably, the detecting layer further comprises a controlling chip set, a sensing chip set and a driving chip set, and detects surroundings to obtain the plurality of surrounding information, the plurality of surrounding information are received and processed by the computing layer to generate the controlling command, the controlling command includes a plurality of commands, and the dynamic layer has a plurality of omni-wheels, a vehicle on which the plurality of omni-wheels are rotatably secured, and a plurality of dynamic elements respectively driving the plurality of omni-wheels.

Preferably, the plurality of surrounding information are received by the sensing chip set from the surroundings and transmitted to the processing unit by the controlling chip set.

Preferably, the plurality of commands are transmitted to the driving chip set by the controlling chip set.

Preferably, the computing layer has an interface by which the processing unit and the control set communicate with each other.

Preferably, the plurality of surrounding information are received from the surroundings and transmitted to the controlling chip set by the sensing chip set, and the plurality of commands are received by the controlling chip set and transmitted to the dynamic elements by the driving chip set.

Preferably, the plurality of dynamic elements are motors, and the plurality of surrounding information are received and processed by the modular service-oriented software to generate the plurality of commands so as to control the plurality of dynamic elements and the plurality of omni-wheels.

Preferably, the dynamic layer further comprises a power source providing a power to the plurality of dynamic elements, and the power source is a battery.

Preferably, the processing unit is one selected from a group consisting of a personal computer, a server, a notebook computer, an electronic device having a central processing unit and a combination thereof.

Preferably, the modular service-oriented software is a Microsoft Robotics Developer Studio (MSRDS) software.

Preferably, the MSRDS software further comprises a control service, a tasks service, a sensor service, a laser sensor service, a driver service, an ultrasonic distance service, an electrical compass service, a video device service, an image sensing service and a GPS service.

Preferably, each of the services further comprises a service identifier, a contract identifier, a partner, a service handler, a main port, a state, a notification and a data member.

Preferably, the tasks service plans at least one path inspection mode being one selected from a group consisting of a transversal path inspection mode, a longitudinal path inspection mode, a random path inspection mode and a grid path inspection mode.

Preferably, the tasks service plans at least one special path inspection mode being one of a fixed-position density inspection mode and an obstacle-avoidance mode.

Preferably, the plurality of sensors are ones selected from a group consisting of an ultrasonic distance sensor, an electrical compass, a laser scanner, a video camera, an image sensor, a GPS and a combination thereof.

According to the second aspect of the present invention, an inspecting device is provided. An inspecting device comprises a computing layer installed with a modular service-oriented software and generating a controlling signal; and a dynamic layer carrying the computing layer and controlled by the controlling signal.

Preferably, the inspecting device further comprises a detecting unit having a plurality of sensors detecting surroundings to obtain a plurality of surrounding information, wherein the computing layer is a computing layer has a processor in which the modular service-oriented software is installed, the controlling signal includes a plurality of controlling commands, the dynamic layer is a dynamic layer has a plurality of omni-wheels, a vehicle on which the plurality of omni-wheels are rotatably secured, and a plurality of dynamic elements respectively driving the plurality of omni-wheels, the detecting unit is carried by the dynamic level, and the plurality of surrounding information are received and processed by the computing layer for generating the plurality of controlling commands.

Preferably, the inspection device is a surface inspecting robot inspecting a pavement.

According to the third aspect of the present invention, an inspecting method is provided. An inspecting method comprises the steps of providing a computing layer installed with a modular service-oriented subunit and a dynamic layer carrying the computing layer; and generating a controlling signal from the computing layer to control the dynamic layer.

Preferably, the inspecting method further comprises a step of providing a detecting unit having a plurality of sensors detecting surroundings to obtain a plurality of surrounding information, wherein the computing layer is a processor, the dynamic layer is a moving unit, the detecting unit is carried by the moving unit, and the plurality of surrounding information are received and processed by the processor to generate the controlling signal.

The foregoing and other features and advantages of the present invention will be more clearly understood through the following descriptions with reference to the drawings:

DETAILED DESCRIPTION OF THE PREFERRED EMBODIMENT

The present invention will now be described more specifically with reference to the following embodiments. It is to be noted that the following descriptions of preferred embodiments of this invention are presented herein for the aspect of illustration and description only; it is not intended to be exhaustive or to be limited to the precise from disclosed.

◎Hardware Architecture◎

Figure 1:
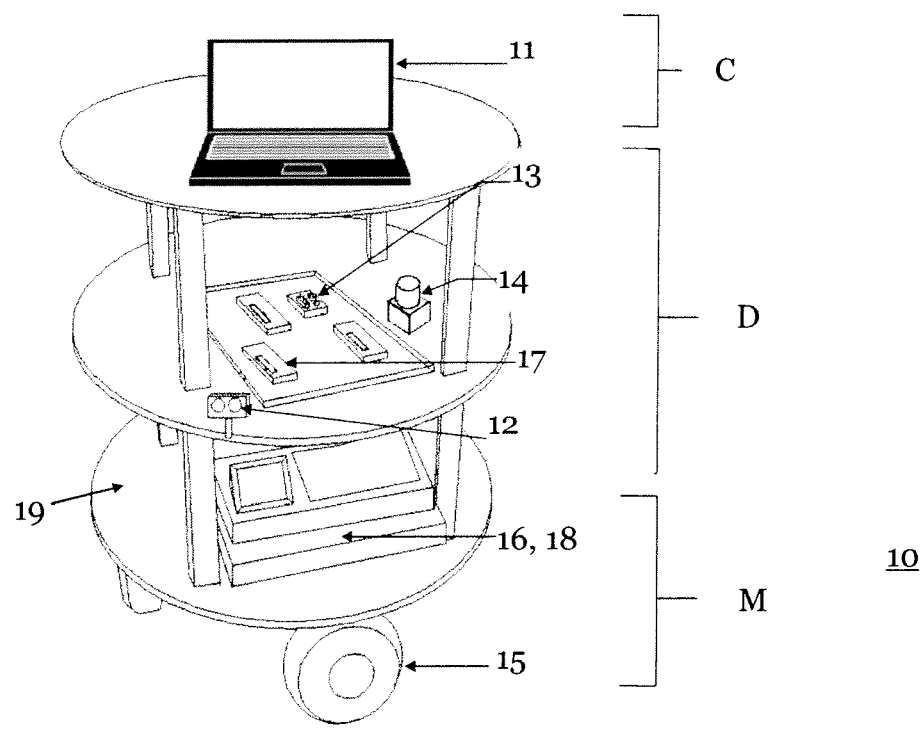
FIG. 1 a diagram illustrating the architecture for the surface inspecting device according to the present invention.

Please refer to FIG. 1, which is a diagram illustrating the architecture for the surface inspecting device according to the present invention. The modular surface inspecting device 10 in FIG. 1 is realized by being configured as a robot. The surface inspecting device 10 in FIG. 1 includes a computing layer C, a detecting layer D and a dynamic layer M, wherein the computing layer C is preferably set at the top of the surface inspecting device 10 and a processing unit is set in the computing layer C, wherein the processing unit is one selected from a group consisting of a personal computer, a server, a notebook computer, an electronic device having a central processing unit and a combination thereof. In this preferred embodiment, the processing unit is preferably a notebook computer 11. A modular service-oriented software for operating the surface inspecting device 10 is installed in the notebook computer 11. In this preferred embodiment, the modular service-oriented software is the Microsoft Robotics Developer Studio (MSRDS). The computing layer C is mainly used for receiving and processing the surrounding information from the detecting layer D whereby the dynamic layer M will determine the motion pattern of the surface inspecting device 10 at the next time. The detecting layer D is preferably set at the middle of the surface inspecting device 10. There are various sensors disposed in the detecting layer D including a supersonic range finder 12, an electronic compass 13 and a laser scanner 14 etc. Furthermore, the various sensors are ones selected from a group consisting of an ultrasonic distance sensor, an electrical compass, a laser scanner, a video camera, an image sensor, a GPS and a combination thereof. In additional to the above-mentioned sensors, an image sensing device, an image-acquiring device or a combination of the above-mentioned sensors could also be further disposed in the detecting layer D. Since the laser scanner 14 has a scanning scope up to 270° degree, the laser scanner 14 is thus set at the top of the surface inspecting device 10, so as to prevent the scanning scope thereof obstructed. A chip set 17 including a BS2p24 controlling chip set, a BS2 sensing chip set and a BS2 driving chip set (Parallax, 2004) is further included in the detecting layer D. Typically, the detecting layer D is mainly used for obtaining the surrounding information from the external environment and communicating with the computing layer C by the above-mentioned three chip sets.

The dynamic layer M is set at the bottom of the surface inspecting device 10. There is a vehicle 19 in the dynamic layer M as being a carrier or a kinematic vehicle, which vehicle 19 is used for carrying and moving the surface inspecting device 10 and the above-mentioned elements disposed in the surface inspecting device 10. At least three omni-wheels 15 are disposed in the dynamic layer M. Each of the omni-wheels 15 is correspondingly quipped with a motor 16 and the respective motors 16 are correspondingly quipped with a motor driving chip set (not shown in FIG. 1). In this preferred embodiment, the motor 16 is preferably a direct current (DC) motor. The dynamic layer M further includes power sources being two batteries 18 for providing a dynamic power to motor 16.

Therefore, the surface inspecting device 10 according to the present invention is implemented in accordance with the above-mentioned three-layer architecture. The surface inspecting device 10 built with the above-mentioned three-layer architecture owns very flexible hardware architecture. While any hardware element has to be changed, it is only needed to newly remove or add the hardware element from or into one layer of the three layers, without substantially changing the hardware architecture of the surface inspecting device 10. For instance, if a user would like to adopt a more powerful computing host, what the user only has to do is to update or replace the notebook 11 disposed in the computing layer C to a more powerful one with highly computing performance. Besides, the user can also arbitrarily add/replace/change/remove the various sensors disposed in the detecting layer D. For instance, the user can add a new digital camera into the detecting layer D for retrieving the image data from environment.

Figure 2:
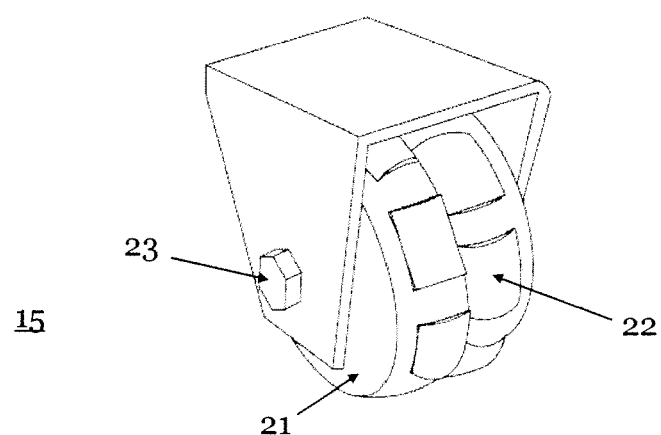
FIG. 2 is a diagram illustrating the omni-wheel according to the present invention.

Please refer to FIG. 2, which is a diagram illustrating the omni-wheel according to the present invention. The omni-wheel 15 in FIG. 2 includes the main wheel 21 rotatably fixed on the wheel axle 23 and the sub-wheel 22 rotatably fixed on the main wheel 21. The omni-wheel 15 having the main wheel 21 and the sub-wheel 22 could agilely motion in any direction not limited to the wheel axle 23 as a conventional wheel that can only move forward in one direction. Therefore, the surface inspecting device 10 can agilely manipulate various motion patterns to engage inspection/diction for a various of the surfaces or pavements. The surface inspecting device 10 can also further incorporate with the MSRDS software installed in the notebook 11 to develop more and versatile motion patterns.

Figure 3:
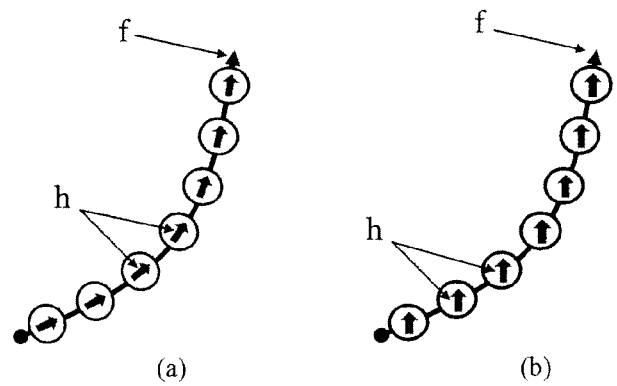
FIG. 3(a) is a diagram illustrating the moving direction and the head direction for a conventional vehicle robot.
FIG. 3(b) is a diagram illustrating the moving direction and the head direction for a robot according to the present invention.

Pleaser refer to FIGS. 3(a) and 3(b), which are diagrams respectively illustrating the moving direction and the head direction for a conventional vehicle robot and illustrating the moving direction and the head direction for a robot according to the present invention. As shown in FIG. 3(a), for a conventional vehicle robot, the moving direction f and the head direction h thereof are consistency. As shown in FIG. 3(b), for a robot having omni-wheel according the present invention, the moving direction f and the head direction h thereof are independent. Such design is convenient for detecting or inspecting the surface. Since while the sensor disposed in the detecting layer D is secured on the vehicle 19, the surface inspecting device 10 having omni-wheel could still agilely utilize the sensors to detect surroundings.

◎Chip Set Architecture◎

Figure 4:
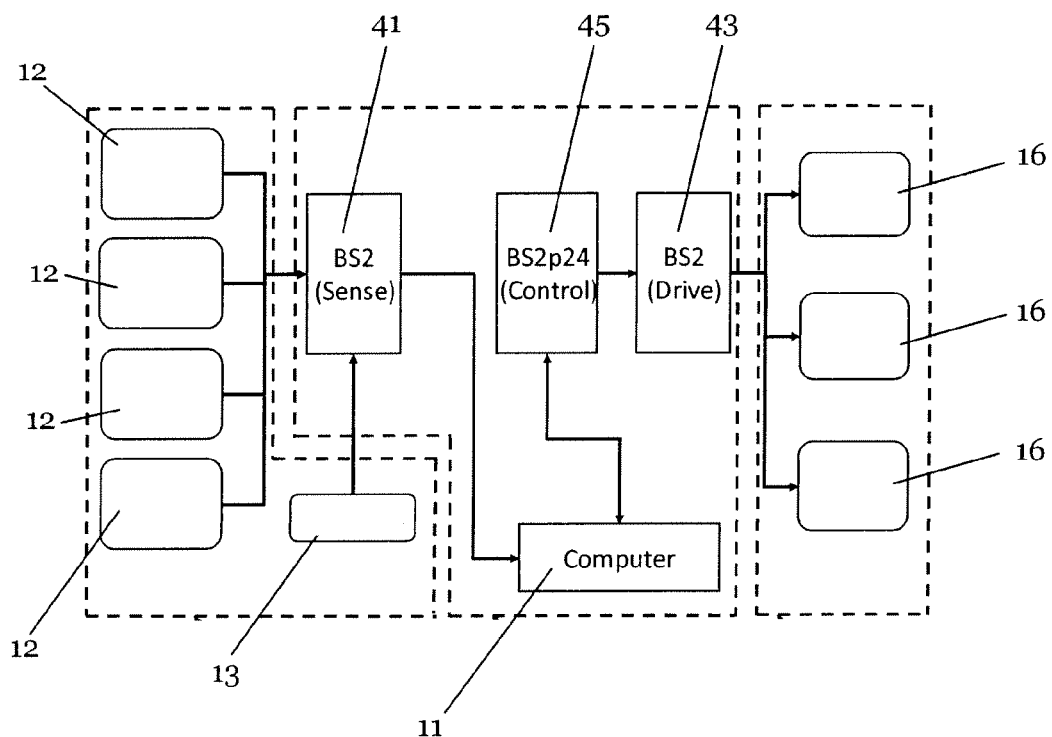
FIG. 4 is a diagram illustrating the chip set architecture according to the present invention.

Please to FIG. 4, which is a diagram illustrating the chip set architecture according to the present invention. The chipset 17 in the detecting layer D utilizes a BS2 sensing chip set 41, a BS2 driving chip 43 and a BS2p24 controlling chip set 45 to communicate with the notebook 11 in the computing layer C, wherein the BS2 sensing chip set 41 is particularly used for receiving the various surrounding information transmitted from various sensor in detecting layer D, e.g. the distance found by the supersonic range finder 12 or the azimuth detected by the electronic compass 13. The BS2p24 controlling chip set 45 coordinates all surrounding information obtained by the BS2 sensing chip set 41 and then transmits the obtained surrounding information to the notebook 11 in the computing layer C. While the MSRDS software installed in the notebook 11 receives the obtained surrounding information, the MSRDS analyses and calculates the motion command to the surface inspecting device 10 at next time based on the information and then transmits the motion command to the BS2p24 controlling chip set 45. Then the BS2p24 controlling chip set 45 will forward the motion command to the BS2 driving chip 43 and the BS2 driving chip 43 will control the motors 16 to actuate the omni-wheel 15.

The above-mentioned BS2-series chip is produced by BaSicStamp2. The BS2-series chip is compiled by PBASIC language. The PBASIC compiler is developed by Parallax Company. The control process is first composed by the PBASIC compiler in the notebook 11 and then outputted to the BS2-series chip through the RS232 interface configured in the notebook 11.

Figure 5:
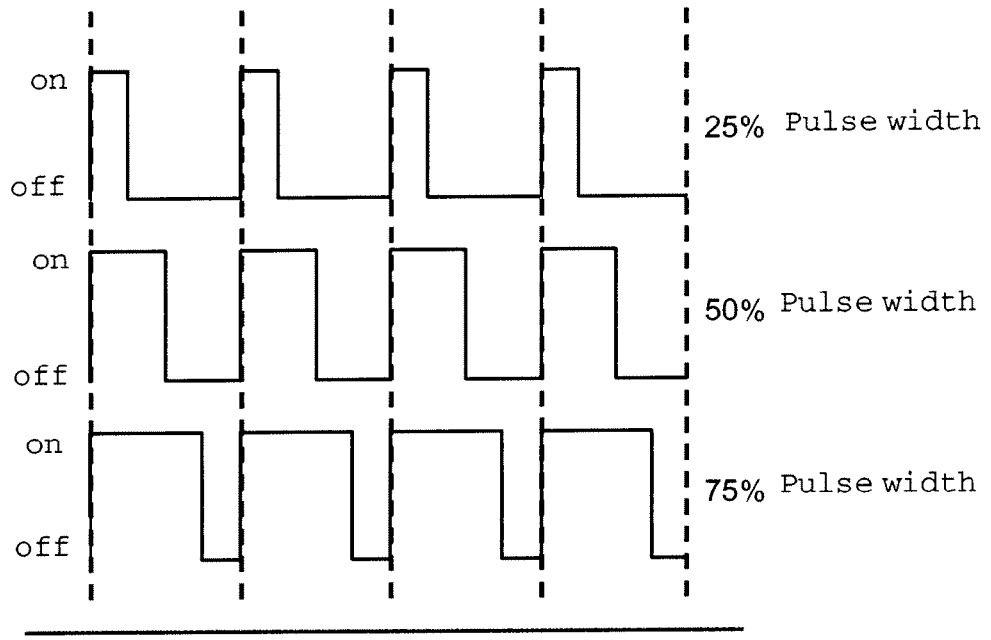
FIG. 5 is a diagram illustrating the pulse width modulation according to the present invention.

Please refer to FIG. 5, which is a diagram illustrating the pulse width modulation according to the present invention. The motors 16 in the present invention are preferably the DC motor that is controlled by the pulse width modulation (PWM) method. As shown in FIG. 5, a different output power is controlled by different pulse width in the method meaning the output power is proportionally corresponded to the pulse width. While the pulse width gets wider, the output power gets greater and the motors 16 rotate fast. Therefore, while the BS2-series chip output the PWM signal, the power level in the chip varies time by time. When the chip has a high power level, the chip will maintain outputting the high power level during a specific period of time until the assigned pulse width. During the mentioned period outputting the PWM signal, the chip can not receive the inputted message from external environment, which is an idol state. Therefore, if there is only one single chip adopted, it might happen that the single chip is in such idol state that can not communicate with the external environment.

In order to avoid the above-mentioned defect, two or more BS2-series chips are unitized by the present invention. Thus the two or more BS2-series chips are adopted for staggering the idol state for the respective motors 16 so as to avoid the above-mentioned defect.

◎Software Architecture◎

Microsoft Robotics Developer Studio (MSRDS) software developed by Microsoft 2006 is installed in the notebook 11 in the computing layer C. The MSRDS is a general robot development platform that is mainly used for providing an integral software architecture, a communicating platform and a executing environment for a developer. The MSRDS mainly consists of two components, Concurrency and Coordination Runtime (CCR) and Decentralized Software Services (DSS). The CCR component is used for managing the programs and the communicating schemes. By the CCR database, a user can easily compose a multi-thread that is needed by a robot. A program with CCR component has the parallel computation capability and the real-time processing capability. The DDS component provides a user with an united software architecture to divide the programs into several independent services. The respective independent services communicate with each other by the CCR data base. Then the program could own the extendibility, the flexibility and the reusability accordingly. Therefore, the MSRDS is installed in the computing layer C of the surface inspecting device 10 according to the present invention. The MSRDS will process the various surrounding information collected by the various sensors disposed in the detecting layer D and render the surface inspecting device 10 to respond and judge the situation in real-time.

When the surface inspecting device 10 operates, any received surrounding information will be put into the threads going to be executed. The CCR service could not only determine the weight for every event according to the thread so as to distinguish the task that has to be executed prior from the task has to be executed but not prior. For instance, an obstacle-avoidance event is the task that has to be executed prior, and a marching to an object point is the task has to be executed but not prior. The CCR service can perform quasi-parallel computation for the respective tasks. The quasi-parallel computation refers to use one or more multi-thread to alternatively execute all tasks in the schedule. Conventionally, the program will execute another task after current task is accomplished. The quasi-parallel computation can render program provisionally quitting the current task I to execute another task II. The program can even consequently quit the task II to execute another task III. The program goes back to the task I after the final task is executed. By the same token, the program can alternatively execute all tasks in the schedule. For such CCR service, it can avoid that while the robot encounters an emergent event, the robot still execute another task not related to the emergent event and fails to deal with the emergent event.

Another important core technique for MSRDS is the DSS technique. It is designed in accordance with a service-oriented concept. As similar to the object-oriented concept, the DSS technique allows a user to compose an independent service for the respective hardware element. For instance, two services independent from each other are respectively composed for the operation of the omni-wheel 15 and the operation of the motor 16. By such technique and mechanism, the software architecture owns more degree of freedom. While any hardware element is added/changed/removed, the only thing has to do is to replace a new adequate service corresponding to the newly added/changed/removed hardware element instead of the original inadequate service. Therefore, the whole control program does not need to be entirely recomposed.

Therefore, MSRDS is adopted in the present invention as being a software architecture. The respective service corresponded to the respective hardware element is composed by MSRDS. For instance, process that the BS2p24 controlling chip set 45 used for forwarding the motion commands is composed as a control service by MSRDS. The process that the laser scanner 14 scans surrounding is composed as a laser sensor service. The process that the BS2 sensing chip set 41 receives the various surrounding information transmitted from various sensor is composed as a sensor service. The planned path inspection scripts on which the surface inspecting device 10 moves based is composed as the tasks service by MSRDS.

Figure 6:
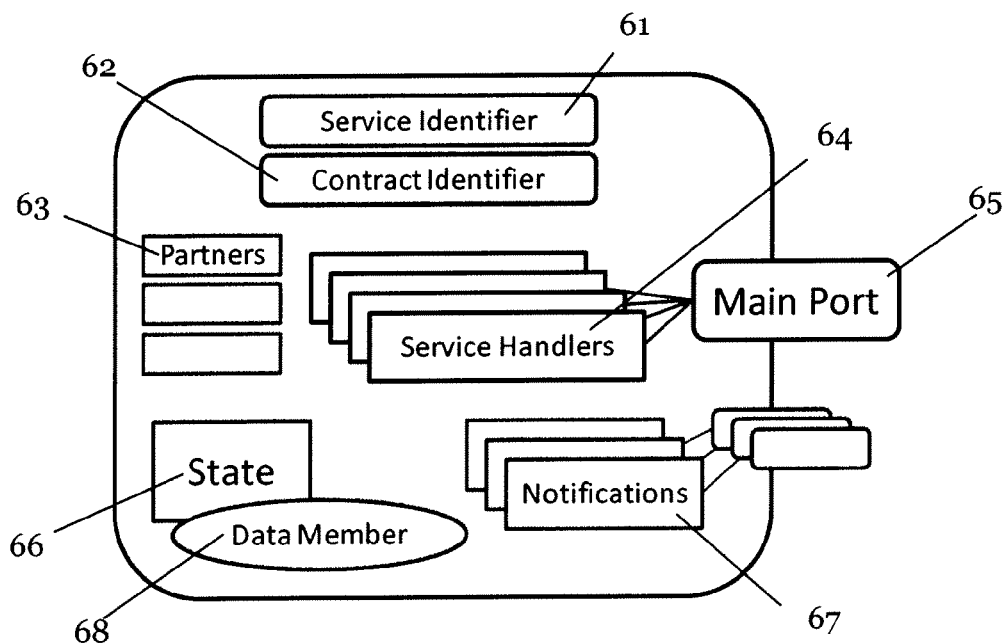
FIG. 6 is a diagram illustrating the contents of the respective service of MSRDS according to the present invention.

Please refer to FIG. 6. which is a diagram illustrating the contents of the respective service of MSRDS according to the present invention. The respective services in MSRDS mainly consists of a Service Identifier 61, a Contract Identifier 62, a Partners 63, a Service Handler 64, a Main Port 65, a State 66, a Notification 67 and a Data Member 68. The Service Identifier 61 is a unique identifier for the respective service that is each of the services has one corresponding Service Identifier 61. Another service can find a specific service utilizing the unique Service Identifier 61. The Contract Identifier 62 records the behavior of a specific service that could be provided to other services. The State 66 represents the current state of a specific service, e.g. for a sensor service, the State 66 stores the value which the sensor detects. The respective service receives the information by the Main Port 65 and distributes to the suitable the Service Handlers 64 to further process the information. There is a partner relationship among services. The Partner 63 declares/defines the partner relationship among services. While there is a partner relationship between two services, one specific service can subscribe the other service. The subscribing relationship exists among the partner relationship services only. Once the information in the subscribed service is varied, the subscribed service sends the varied information to the other service needing the information by the Notification 67 through the Main Port 65.

Figure 7:
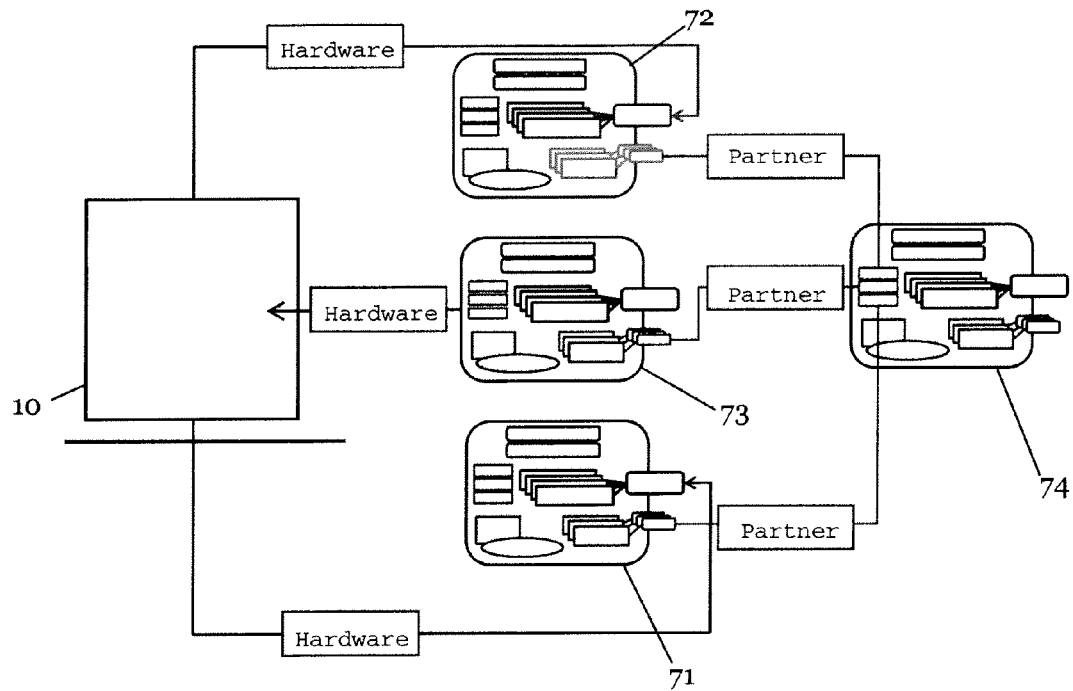
FIG. 7 is a diagram illustrating the corresponding relationship between the service and the hardware element.

Please refer to FIG. 7, which is a diagram illustrating the corresponding relationship between the service and the hardware element. The sensor service 71 and the laser sensor service 72 will actively detect the hardware elements and communicate with the detected hardware elements. Then the sensor service 71 and the laser sensor service 72 will cooperate to acquire the surrounding information obtained by the laser scanner 14. The driver service 73 is the service to distribute the motion commands for the surface inspecting device 10 which service 73 is corresponded to the motor 16. The three services 71, 72 and 73 are independent form each other. Once the respective hardware elements corresponding to the three services 71, 72 and 73 are replaced/changed/removed, the only thing to do is to replace/change/remove the corresponding one of the three services 71, 72 and 73 and the rest two services are not affected thereby. The tasks service 74 is only used for distributing/assigning the path inspection on which the surface inspecting device 10 moves based. The tasks service basically is used for planning at least one path inspection mode being one selected from a group consisting of a transversal path inspection mode, a longitudinal path inspection mode, a random path inspection mode and a grid path inspection mode. There is a partner-based relationship between the tasks service 74 and the above-mentioned three services 71, 72 and 73. The tasks service 74 can communicates with other partner-based relationship services by the subscribing or commanding. Accordingly, there are further services such as an ultrasonic distance service, an electrical compass service, a video device service, an image sensing service and a GPS service included in MSRDS.

Figure 8:
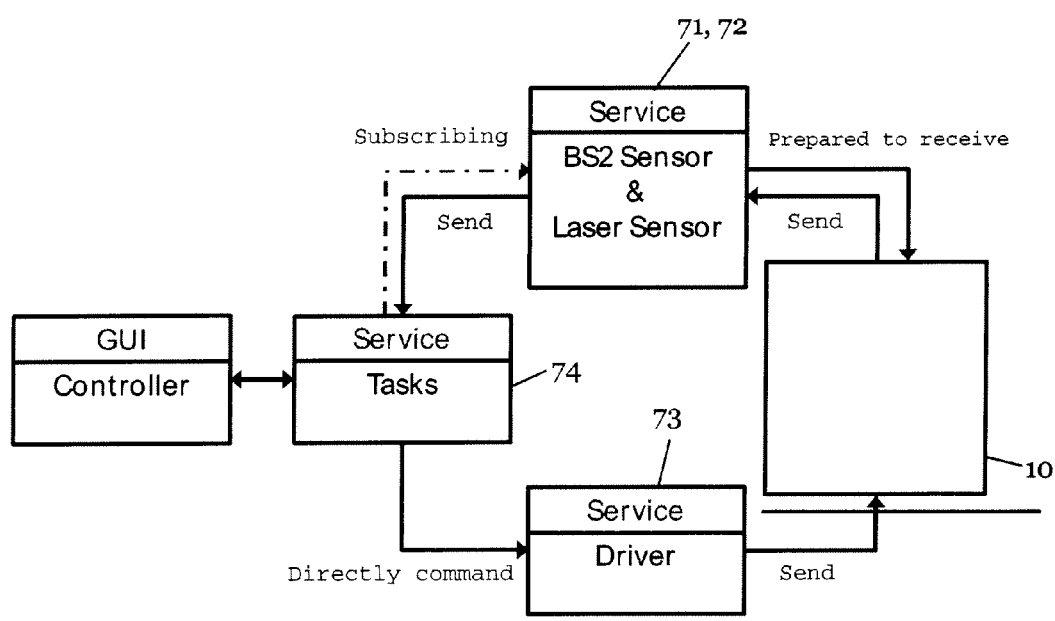
FIG. 8 is a diagram illustrating the interaction concept between the hardware architecture and the software architecture according to the present invention.

Please refer to FIG. 8, which is a diagram illustrating the interaction concept between the hardware architecture and the software architecture according to the present invention. With regard to the interaction during runtime, the control program first provides a graphic user interface (GUI) and a controller. A user can communicate with the services 71, 72, 73 and 74 by the GUI and assign tasks to the surface inspecting device 10 or control the robot by the controller. The GUI and the controller is not the above-mentioned service. As aforementioned, the tasks service 74 is the core for controlling motion pattern for the surface inspecting device 10. The sensor service 71 and the laser sensor service 72 collect the information acquired by the sensors in the detecting layer D and transmits these information to the tasks service 74 by the subscribing mechanism. The driver service 73 directly receives the commands from the tasks service to perform the communications with and control to the hardware element. During runtime, the sensor service 72 transmits the command to require the corresponding BS2 sensing chip set 41 to receive information obtained by the various sensors. Then the BS2 sensing chip set 41 will transmit the surrounding information to the sensor service 72 for updating the current surrounding information. The tasks service 74 actively inquires the sensor service 72 regarding the latest surrounding information. The tasks service 74 will judge the received latest surrounding information and transmits it to the driver service 73. Then the driver service 73 will transmit it the dynamic unit (motor 16) in the dynamic layer M and to control the dynamic unit. Accordingly, the user can control the surface inspecting device 10 and assign tasks to the surface inspecting device 10 by the GUI and the controller.

⊚The Path Inspection Planning⊚

Figure 9:
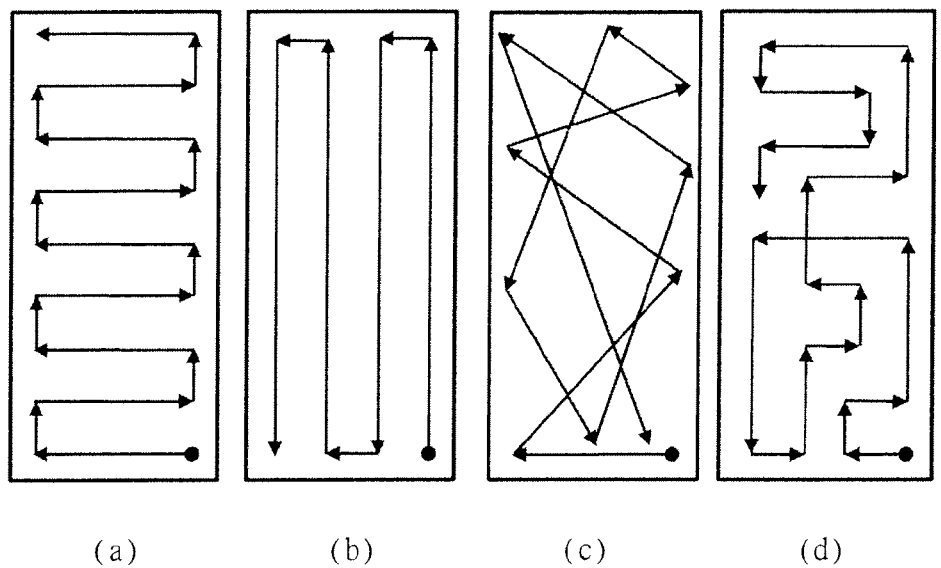
FIG. 9(a) is a diagram illustrating a transverse path inspection mode according to the present invention.
FIG. 9(b) is a diagram illustrating a longitude path inspection mode according to the present invention.
FIG. 9(c) is a diagram illustrating a random path inspection mode according to the present invention.
FIG. 9(d) is a diagram illustrating a grid path inspection mode according to the present invention.

There are at least four kinds of the path inspection planned in the tasks service 74, including a transverse path inspection mode, a longitude path inspection mode, a random path inspection mode and a grid path inspection mode. Please refer to FIGS. 9(*a*)~9(*d*), which are schematic diagrams respectively illustrating the planned four kinds of the path inspection mode, wherein FIG. 9(*a*) shows a transverse path inspection mode, FIG. 9(*b*) shows a longitude path inspection mode, FIG. 9(*c*) shows a random path inspection mode and FIG. 9(*d*) shows a grid path inspection mode. The path inspection means the pre-determined trail where the surface inspecting device 10 moves for inspecting the surface or pavement. The above-mentioned random path inspection mode is to randomly determine the parameters regarding movement of the surface inspecting device 10, such as the turn-round angle for the surface inspecting device 10 and the forwarding length. The surface inspecting device 10 randomly moves under the random path inspection mode.

Figure 10:
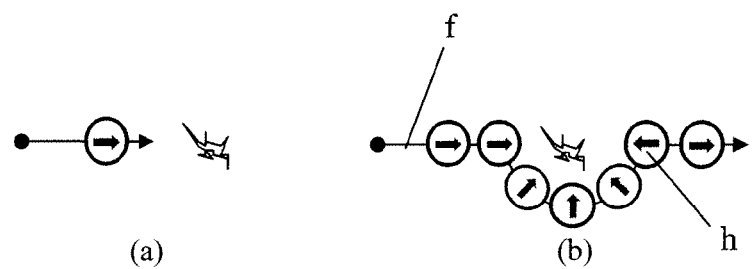
FIGS. 10(a) and 10(b) are diagrams illustrating the fixed-position density inspection mode according to the present invention.

The present invention provides two kind of special motion pattern in addition, including the fixed-position density inspection mode and the obstacle-avoidance mode. That is the tasks service further plans at least one special path inspection mode being one of a fixed-position density inspection mode and an obstacle-avoidance mode. Please refer to FIGS. 10(*a*) and 10 (*b*), which are diagrams illustrating the fixed-position density inspection mode according to the present invention. While the surface inspecting device 10 encounters the broken point in fractal that has to be sampled densityly on the surface, the motion pattern will be switched to the fixed-position density inspection mode. Due to the characteristics of the omni-wheel disposed on the surface inspecting device 10, since the moving direction f of the surface inspecting device 10 is independent from the head direction h of the surface inspecting device 10, the surface inspecting device 10 per se can move along the moving direction f that bypasses the broken point on the surface but the head thereof still maintains in the direction h that persistently focuses toward the broken point. Thus the sensor disposed in the detecting layer D could simple the information regarding the broken point in density. Therefore, much information regarding the broken point are collected which is helpful for the post-analysis to the broken point.

Figure 11:
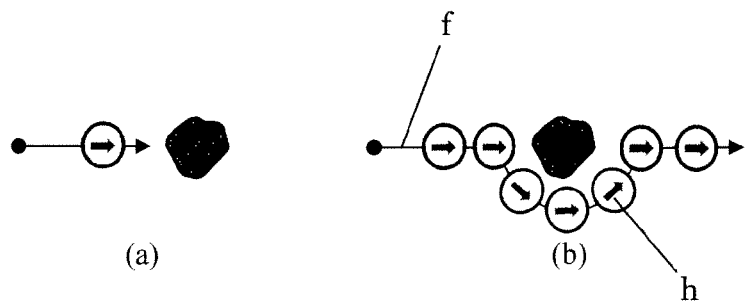
FIGS. 11(a) and 11(b) are diagrams illustrating the obstacle-avoidance mode according to the present invention.

Please refer to FIGS. 11(*a*) and 11(*b*), which are diagrams illustrating the obstacle-avoidance mode according to the present invention. When the surface inspecting device 10 performs the inspection, it needs an obstacle-avoidance mode so as to bypass the obstacle that might exist on the planned path inspection and does not need to be inspected. That is when the surface inspecting device 10 moves in accordance with the above-mentioned four kinds of the planned path inspection or with the fixed-position density inspection mode, if there is an obstacle found on the planned path, the surface inspecting device 10 has to avoid this obstacle for the sake of safety. While encountering an obstacle, the MSRDS installed in the computing layer C of the surface inspecting device 10 performs the above-mentioned quasi-parallel computing to provisionally suspend the normal planned path inspection mode run in the tasks service and then switches into the obstacle-avoidance mode. In reference with FIGS. 11(*a*) and 11(*b*), the tasks service controls the surface inspecting device 10 to bypass the obstacle without inspecting the obstacle.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims that are to be accorded with the broadest interpretation, so as to encompass all such modifications and similar structures. Accoring, the invention is not limited by the disclosure, but instead its scope is to be determined entirely by reference to the following claims.

What is claimed is:

1. A modular surface inspecting device, comprising:
    a computing layer having a processing unit in which a modular service-oriented software is installed;
    a detecting layer having a plurality of sensors obtaining a plurality of surrounding information; and
    a dynamic layer having a plurality of omni-wheels, a plurality of dynamic elements respectively driving the individual omni-wheels and a vehicle on which the plurality of omni-wheels are rotatably secured for carrying the computing layer and the detecting layer, and controlled by a controlling command generated by the computing layer according to the plurality of surrounding information,
    wherein the detecting layer further comprises a controlling chip set, a sensing chip set and a driving chip set, and detects surroundings to obtain the plurality of surrounding information, the plurality of surrounding information are received and processed by the computing layer to generate the controlling command, the controlling command includes a plurality of commands, and
    wherein the plurality of surrounding information are received by the sensing chip set from the surroundings and transmitted to the processing unit by the controlling chip set.

2. A modular surface inspecting device, comprising:
    a computing layer having a processing unit in which a modular service-oriented software is installed;
    a detecting layer having a plurality of sensors obtaining a plurality of surrounding information; and
    a dynamic layer having a plurality of omni-wheels, a plurality of dynamic elements respectively driving the individual omni-wheels and a vehicle on which the plurality of omni-wheels are rotatably secured for carrying the computing layer and the detecting layer, and controlled by a controlling command generated by the computing layer according to the plurality of surrounding information,
    wherein the detecting layer further comprises a controlling chip set, a sensing chip set and a driving chip set, and detects surroundings to obtain the plurality of surrounding information, the plurality of surrounding information are received and processed by the computing layer to generate the controlling command, the controlling command includes a plurality of commands, and
    wherein the plurality of commands are transmitted to the driving chip set by the controlling chip set.

3. The modular surface inspecting device according to claim 2, wherein the computing layer has an interface by which the processing unit and the control set communicate with each other.

4. A modular surface inspecting device, comprising:
    a computing layer having a processing unit in which a modular service-oriented software is installed;
    a detecting layer having a plurality of sensors obtaining a plurality of surrounding information; and
    a dynamic layer having a plurality of omni-wheels, a plurality of dynamic elements respectively driving the individual omni-wheels and a vehicle on which the plurality of omni-wheels are rotatably secured for carrying the computing layer and the detecting layer, and controlled by a controlling command generated by the computing layer according to the plurality of surrounding information, wherein the detecting layer further comprises a controlling chip set, a sensing chip set and a driving chip set, and detects surroundings to obtain the plurality of surrounding information, the plurality of surrounding information are received and processed by the computing layer to generate the controlling command, the controlling command includes a plurality of commands, and wherein the plurality of surrounding information are received from the surroundings and transmitted to the controlling chip set by the sensing chip set, and the plurality of commands are received by the controlling chip set and transmitted to the dynamic elements by the driving chip set.

5. The modular surface inspecting device according to claim 4, wherein the plurality of dynamic elements are motors, and the plurality of surrounding information are received and processed by the modular service-oriented software to generate the plurality of commands so as to control the plurality of dynamic elements and the plurality of omni-wheels.

6. The modular surface inspecting device according to claim 4, wherein the dynamic layer further comprises a power source providing a power to the plurality of dynamic elements, and the power source is a battery.

7. The modular surface inspecting device according to claim 4, wherein the processing unit is one selected from a group consisting of a personal computer, a server, a notebook computer, an electronic device having a central processing unit and a combination thereof.

8. The modular surface inspecting device according to claim 4, wherein the modular service-oriented software is a Microsoft Robotics Developer Studio (MSRDS) software.

9. The modular surface inspecting device according to claim 8, wherein the MSRDS software further comprises a control service, a tasks service, a sensor service, a laser sensor service, a driver service, an ultrasonic distance service, an electrical compass service, a video device service, an image sensing service and a GPS service.

10. The modular surface inspecting device according to claim 9, wherein each of the services further comprises a service identifier, a contract identifier, a partner, a service handler, a main port, a state, a notification and a data member.

11. The modular surface inspecting device according to claim 9, wherein the tasks service plans at least one path inspection mode being one selected from a group consisting of a transversal path inspection mode, a longitudinal path inspection mode, a random path inspection mode and a grid path inspection mode.

12. The modular surface inspecting device according to claim 11, wherein the tasks service plans at least one special path inspection mode being one of a fixed-position density inspection mode and an obstacle-avoidance mode.

13. The modular surface inspecting device according to claim 4, wherein the plurality of sensors are ones selected from a group consisting of an ultrasonic distance sensor, an electrical compass, a laser scanner, a video camera, an image sensor, a GPS and a combination thereof.

* * * * *